United States Patent
Lucidarme (10) Patent No.: US 6,823,177 B1
(45) Date of Patent: Nov. 23, 2004

(54) RADIO STATION WITH CIRCULARLY POLARISED ANTENNAS

(75) Inventor: Thierry Lucidarme, Montigny Le Bretonneux (FR)

(73) Assignee: Nortel Matra Cellular (FR)

( * ) Notice: Subject to any disclaimer, the term of this patent is extended or adjusted under 35 U.S.C. 154(b) by 820 days.

(21) Appl. No.: 09/155,278

(22) PCT Filed: Mar. 25, 1997

(86) PCT No.: PCT/FR97/00524
§ 371 (c)(1),
(2), (4) Date: Jan. 25, 1999

(87) PCT Pub. No.: WO97/37440
PCT Pub. Date: Oct. 9, 1997

(51) Int. Cl.[7] .............................. H04B 1/02; H04B 1/04
(52) U.S. Cl. ...................... 455/103; 455/101; 455/129; 455/269; 455/107; 455/562.1; 455/575.7; 343/853; 343/820; 343/822; 343/895; 343/797
(58) Field of Search .......................... 455/62, 60, 59, 455/65, 67.1, 67.6, 101, 129, 269, 103, 107; 343/895, 853, 797, 820

(56) References Cited

U.S. PATENT DOCUMENTS

| 5,172,128 A | 12/1992 | Bouko et al. |
| 5,280,631 A | 1/1994 | Nakahi et al. |
| 5,966,102 A | * 10/1999 | Runyon ...................... 343/820 |
| 6,011,524 A | * 1/2000 | Jervis ......................... 343/895 |
| 6,067,053 A | * 5/2000 | Runyon et al. ............. 343/797 |

FOREIGN PATENT DOCUMENTS

EP  0 656 697  6/1995

* cited by examiner

Primary Examiner—Marceau Milord
(74) Attorney, Agent, or Firm—Cantor Colburn LLP (57) ABSTRACT

A radio station including two antennas combined with respective first and second hybrid transmission polarization couplers is disclosed. Each antenna is arranged to generate two orthogonal electric field components in response to two respective quadrature radio signals from the corresponding polarization coupler. The station further includes at least one hybrid distribution coupler with a first output connected to a first input of the first polarization coupler and a second output connected to a first input of the second polarization coupler and at least one radio signal source delivering a radio signal to a first input of the distribution coupler.

14 Claims, 7 Drawing Sheets

RADIO STATION WITH CIRCULARLY POLARISED ANTENNAS

BACKGROUND OF THE INVENTION

This application is a 371 of PCT/FR97/00524 May 25, 1997.

The present invention concerns a radio station, which may be used particularly as a base station in cellular radio systems.

Traditionally, radio-communications systems with mobile radio stations use base stations equipped with vertically and linearly polarised antennas. When it is required to couple more than one radio signal source to an antenna, devices of the hybrid coupler type with only one output connected to the antenna are used. In this case, the other hybrid coupler output must be connected to a load resistor to match the impedance. This load resistor dissipates half the radio power which is not radiated usefully and causes an undesirable rise in temperature.

One drawback of the use of linear polarisation in radio-communications with mobile radio stations is that the quality of communication depends on the orientation of the mobile radio station. For example, measurements have shown that a vehicle antenna of the coaxial type inclined at 45° may cause 80% signal loss for a vertical linear polarisation transmission.

Moreover, it is known that diversity treatments enable the performance of radio-communication systems to be improved. Base stations of cellular systems normally use spatial type diversity in reception, by means of two spatially separate vertically polarised antennas. The use of polarisation diversity rather than spatial diversity has also been suggested. For this two antennas located in the same place are used, one sensitive to vertical polarisation and the other sensitive to horizontal polarisation.

One object of the present invention is to improve the possibilities offered for transmission by a radio communication base station.

SUMMARY OF THE INVENTION

The invention thus proposes a radio station, including two antennas combined respectively with first and second hybrid transmission polarisation couplers, each antenna being arranged to generate two orthogonal electric field components in response to two respective quadrature radio signals from the corresponding polarisation coupler. The station further includes at least one hybrid distribution coupler with a first output connected to a first input of the first polarisation coupler and a second output connected to a first input of the second polarisation coupler, and at least one radio signal source delivering a radio signal to a first input of the distribution coupler.

Thus, each antenna transmits a portion of the radio signal from the circularly polarised source. As a result, the quality of the reception by the mobile radio station no longer depends on the orientation of its antenna in relation to a linear polarisation direction.

In a first version of the invention, the hybrid couplers are connected to each other and to the antennas in such a way that the radio signal from the source is transmitted by the two antennas in the form of two respective radio waves circularly polarised in the same direction. An appropriate relative positioning of the two antennas, and an appropriate choice of length of the coaxial cables connecting the couplers to each other then enables a gain in transmission directivity (up to about 3 dB) to be obtained. Such a gain in directivity means that the base station is highly suitable for the microcellular case, especially when radio penetration inside buildings is required.

In another version of the invention, the hybrid couplers are connected to each other and to the antennas in such a way that the radio signal from the source is transmitted by the two antennas in the form of two respective radio waves circularly polarized in opposite directions. This gives a transmission polarisation diversity which enables the effects of fading to be counteracted. This version is very appropriate in cases where the propagation medium creates relatively little diversity, i.e. when the waves transmitted sustain relatively few reflections (propagation in a rural, desert, maritime environment etc). The gain in diversity thus obtained can run from 3 to 10 dB.

It is noted that it is very easy to switch from one of the versions mentioned above to the other, simply by modifying the connections of the coaxial cables connected to the couplers.

The same type of equipment can thus be used to meet the diverse requirements of the network operator.

The advantages disclosed above can easily be obtained for several radio signal sources. The two coupling stages have the advantage, when several radio sources are connected, of enabling all the available power (except for losses in duplexers) to be radiated usefully, which avoids useless heat being dissipated in the rack.

The use of the two antennas of the invention further enables advantageous arrangements in the reception part of the radio station. These arrangements are combined to advantage with those which have just been mentioned for the transmission part, but they would be applicable independently. In accordance with one of these arrangements, the radio station includes at least one receiver ensuring a diversity treatment of two input radio signals, one of the said input radio signals being obtained from an electric field component picked up by one of the two antennas according to a first direction, and the other input radio signal being obtained from an electric field component picked up by the other antenna according to a second direction orthogonal to the said first direction.

The receiver then combines the advantages of both spatial diversity and polarisation diversity in counteracting fading. It is possible to install several receivers in this way.

DESCRIPTION OF PREFERRED EMBODIMENTS

The radio stations shown in FIGS. 1 and 3 to 8 include two antennas 10, 12 each constituted by two co-located crossed dipoles. For each antenna, the two dipoles are orthogonal, one being intended to be placed vertically, the other horizontally.

Each antenna 10, 12 is connected to a respective hybrid transmission polarisation coupler $14_3$, $14_4$. Each of these couplers $14_3$, $14_4$ has two outputs, one C3, C4 supplying power to the horizontal dipole of its corresponding antenna 10, 12, and the other D3, D4 supplying power to the vertical dipole of its corresponding antenna 10, 12.

Each polarisation coupler $14_3$, $14_4$ is selected so that it can produce two quadrature radio signals at its two outputs C3 and D3, C4 and D4. They may particularly be hybrid couplers of the 0°/90° type such as the one shown as a diagram in FIG. 2. Such a coupler includes a dielectric substrate, provided with a copper earth plane, on which is laid a copper conductor pattern like that shown in FIG. 2. This pattern is composed of two parallel segments Ai-Ci, Bi-Di spaced by $\lambda'/4$, where $\lambda'$ denotes the wave length of the radio signals taking into account the relative permittivity of the substrate, and of two other segments, also parallel to each other and spaced by $\lambda'/4$, extending perpendicularly between the segments Ai-Ci and Bi-Di. The adjacent ends Ai, Bi of the two first segments constitute the two coupler inputs, whereas the two opposite ends of these segments Ci, Di constitute the two outputs of the coupler $14_i$ (i=3, 4). With such a coupler, called a "branchline" coupler, provided that the impedances of the four ports are adapted (typically to 50 Ω), the radio signal reaching the input $A_i$ is divided into two half power portions, one in phase from the output Ci, and the other out-of-phase by −90° from the output Di and, symmetrically, the radio signal reaching the input Bi is divided into two half power portions, one in phase from the output Di, and the other out-of-phase by −90° from the other output Ci.

The components delivered by the outputs Ci and Di of the coupler $14_i$ are thus always in quadrature in relation to each other, such that when they supply power to the two orthogonal dipoles of the corresponding antenna, the two orthogonal electric field components generated by these dipoles lead to the transmission of a circularly polarised radio wave. The circular polarisation direction is different for the radio signal reaching the input Ai of the coupler and for the radio signal reaching the input Bi of the coupler. It will be noted for example that the signal reaching the input Ai is transmitted with leftwards circular polarisation (LCP), and that the radio signal reaching the input Bi of the coupler is transmitted with rightwards circular polarisation (RCP).

Figure 1:
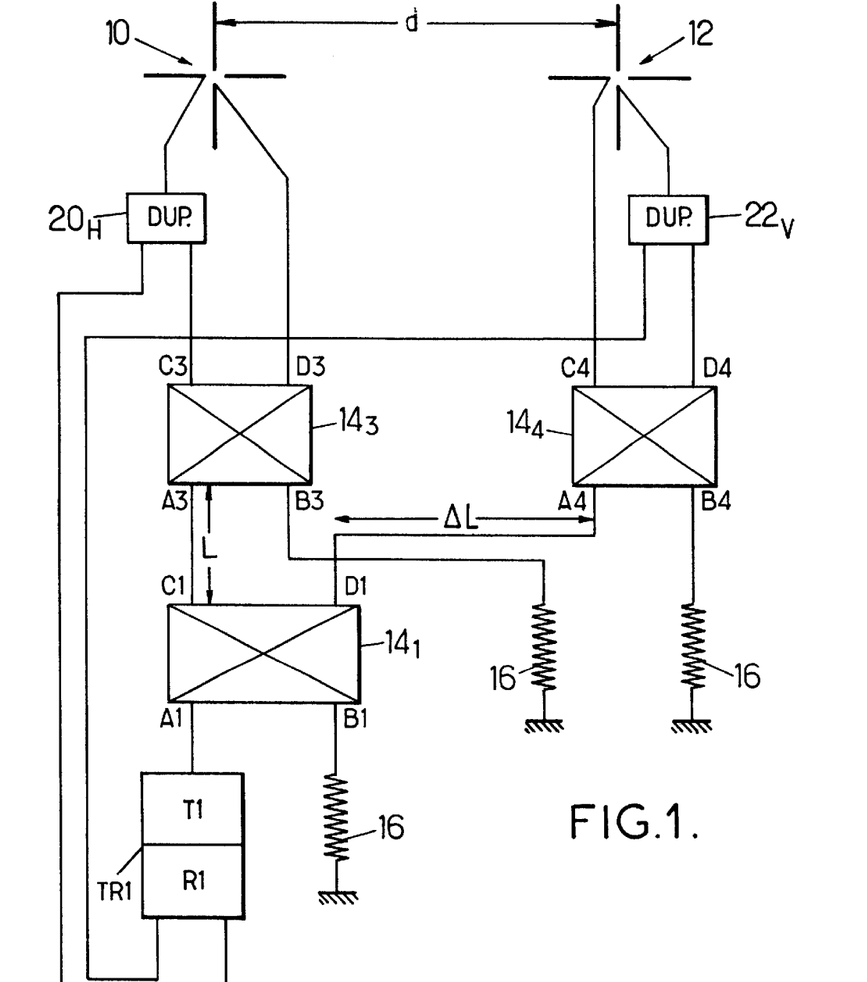
FIG. 1 is a diagram of a radio station in accordance with the invention with one transceiver unit.

In the version example shown in FIG. 1, the inputs A3 and A4 of the polarisation couplers $14_3$, $14_4$ are connected by respective coaxial cables to two outputs C1, D1 of a hybrid distribution coupler $14_1$. This distribution coupler $14_1$ complies for example with the hybrid described by reference to FIG. 2 (i=1). Its input A1 is connected to a source or radio signal transmitter T1 which is part of a transceiver unit TR1. The other input B1 of the distribution coupler $14_1$ is connected to the earth by means of an impedance matching resistor 16. The same is true of inputs B3, B4 of polarisation couplers $14_3$, $14_4$.

With the assembly in FIG. 1, the radio signal from the source T1 is transmitted with LCP by the two antennas 10, 12.

The fact that the two antennas 10, 12 transmit the same radio signal in accordance with the same polarisation can be used to obtain a gain in directivity for this signal. This is obtained by an appropriate choice of distance d between the two antennas 10, 12 and lengths L, L+ΔL of coaxial cable connecting the outputs C1, D1 of the distribution coupler $14_1$, to the inputs A3, A4 of the polarisation couplers $14_3$, $14_4$.

It is known that, when two identical radio signals are to a degree out-of-phase when they reach the two antennas transmitting them in accordance with an identical polarisation mode, the directivity of the transmission system varies with the distance d between the two antennas. A distance d may particularly be selected which leads to a considerable gain in directivity, of about 3 dB for example. In the case of zero phase shift, maximum gain in directivity (2.95 dB) is obtained with the selection d=0.92λ, where λ denotes the wave length in the air of the radio waves. This zero phase shift condition is fulfilled when $\Delta L=(n-\Delta\Phi/2\pi)\lambda''$. In the expression above, ΔL denotes the difference in length between the coaxial cable connecting the output D1 of the coupler $14_1$ to the input A4 of the coupler $14_4$ and the coaxial cable connecting the output C1 of the coupler $14_1$ to the input A3 of the coupler $14_3$, n denotes any integer, λ'' denotes the wave length of the radio signals in the coaxial cables, and ΔΦ denotes the phase difference between the portion of the radio signal present at the output D1 of the distribution coupler and the portion of this same radio signal present at the output C1 of the distribution coupler (ΔΦ=−π/2 when the distribution coupler $14_1$ is of the type shown in FIG. 2).

The gain in directivity makes the radio station highly suitable for applications in sectored base stations or in microcellular network base stations, particularly when there is a requirement for radio wave penetration into buildings.

The receiver R1 of the transceiver unit TR1 is designed to ensure diversity treatment of two input radio signals, as is usual in the field of cellular radio systems. The presence of the two antennas 10, 12 in the radio station enables the advantages of spatial diversity and polarisation diversity to be combined in the two receiver R1 input signals. One of these input signals is the horizontal electric field component picked up by the horizontal dipole of the antenna 10, whereas the other input radio signal is the vertical electric field component in another location picked up by the vertical dipole of the other antenna 12. Two duplexers $20_H$, $22_V$ are connected to the horizontal dipole of the antenna 10 and to the vertical dipole of the antenna 12 respectively so as to separate the transmission and reception paths.

Figure 3:
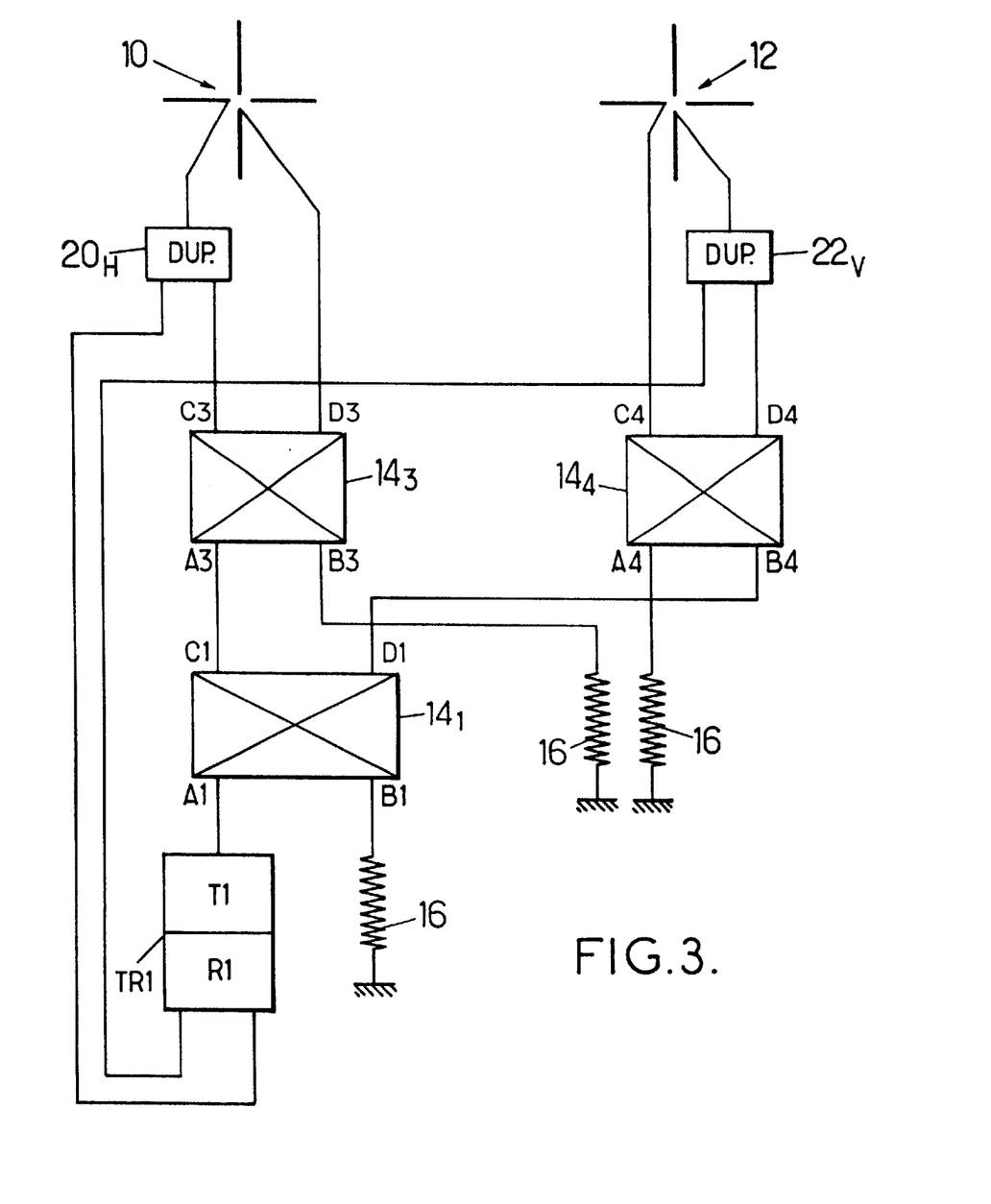
FIG. 3 is a diagram of a variant of a version of the station in FIG. 1.

The version shown in FIG. 3 differs from that shown in FIG. 1 in that the output D1 of the distribution coupler $14_1$ is connected to the input B4 and not to the input A4 of the polarisation coupler $14_4$, the input A4 being then connected to an impedance matching resistor 16. In this case, the radio signal from the source T1 is transmitted with LCP by the antenna 10 and with RCP by antenna 12. The base station then gives spatial and polarisation diversity to the transmission, with the result that it is highly suitable for propagation mediums producing few reflections (rural, desert, maritime environments, etc.).

It is pointed out that the installer of the station may opt for a gain in directivity or a gain in diversity simply by connecting up the coaxial cable connected to the output D1 of the distribution coupler $14_1$ in a different way. It is thus clear that the abundant potential of the same equipment can be realised with only basic adjustments.

Figure 4:
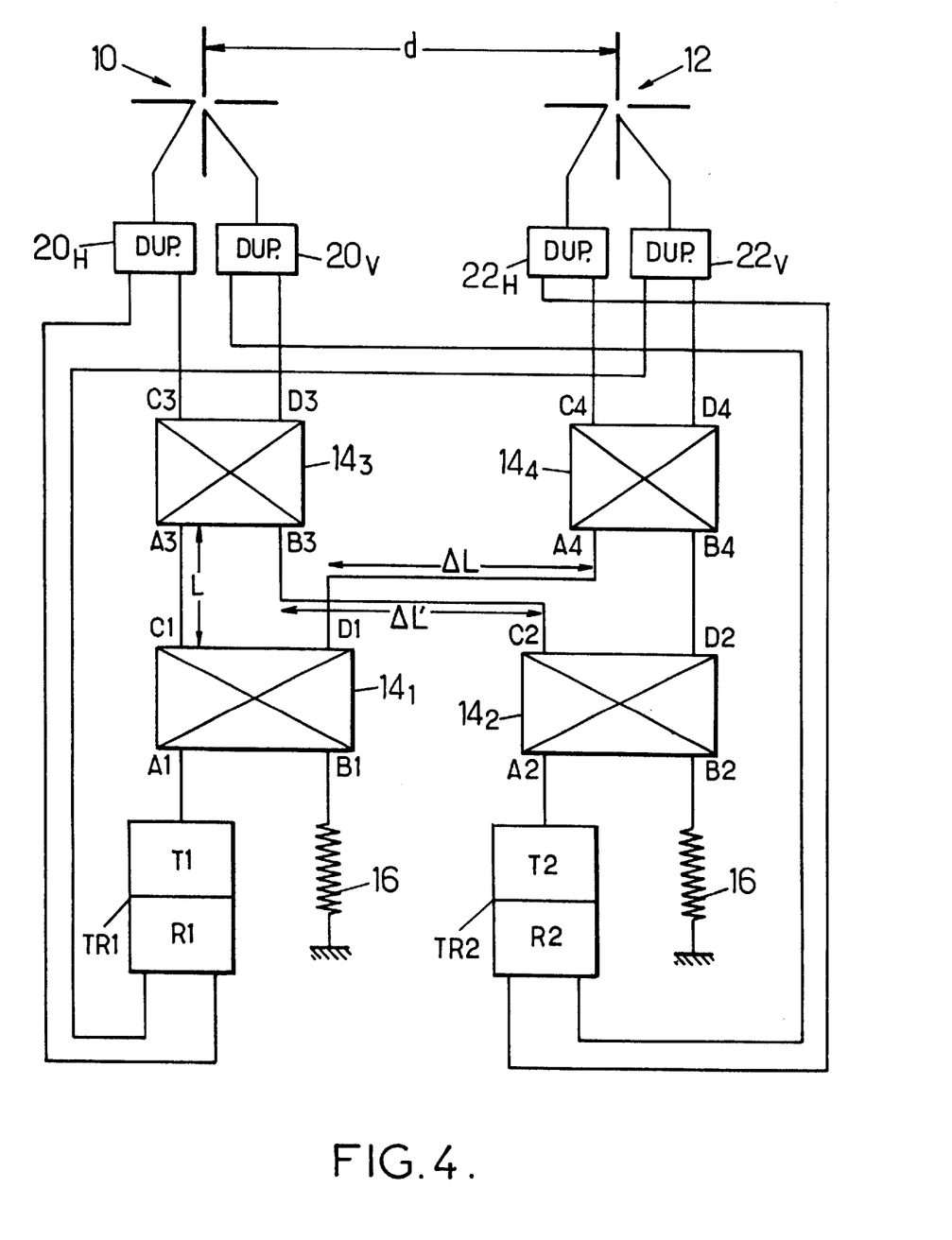
FIGS. 4 to 6 are diagrams of radio stations in accordance with the invention with two transceiver units.
Figure 5:
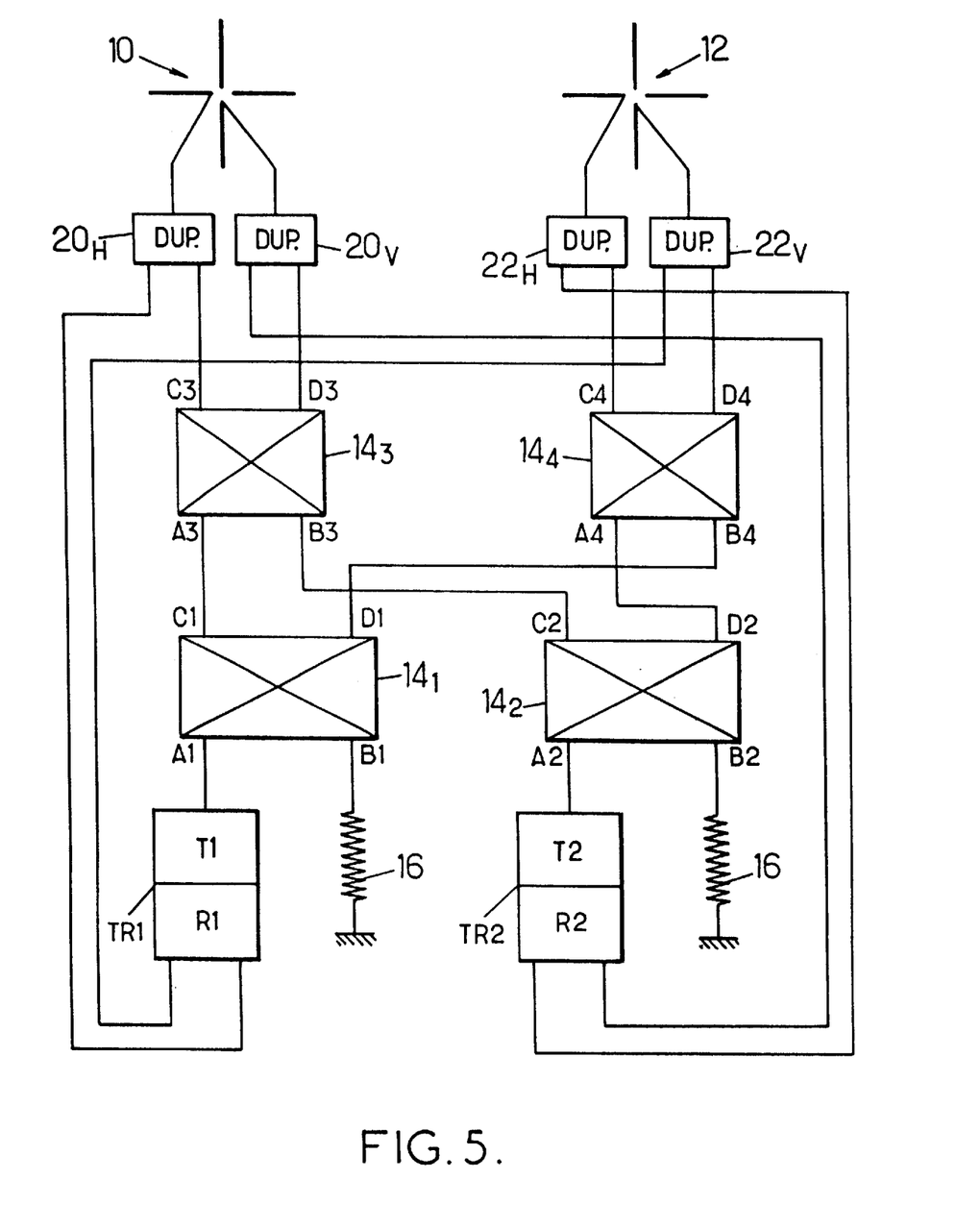

In the versions shown in FIGS. 4 to 5, the radio station comprises a second transceiver unit TR2, TR3, with a radio signal source T2, T3 and a diversity receiver R2, R3. The previously disclosed advantages may be fully obtained for the two transceiver units TR1, TR2.

In the example shown in FIG. 4, a second distribution coupler $14_2$ is provided, for example of the type described by reference to FIG. 2 (i=2). The distribution coupler $14_2$ has its input A2 connected to the output of the source T2, its input B2 connected to an impedance matching resistor 16, its output C2 connected to the input B3 of the polarisation coupler $14_3$, and its output D2 connected to the input B4 of the polarisation coupler $14_4$. Thus, the radio signal from the source T2 is transmitted with RCP by the two antennas 10, 12, whereas the radio signal from the source T1 is transmitted with LCP by the two antennas 10, 12. This enables the advantage of a gain in directivity to be obtained for the two radio signal sources. In the case shown in FIG. 4, the radio signal from the source T2 is out-of-phase by −90° at the output D2 of the coupler $14_2$, and has zero phase shift at the output C2 (i.e. a $\Delta\Phi'$ phase shift of +90° compared with the output D2). The distance d between the two antennas being $0.92\lambda$, the difference in length $\Delta L'$ between the coaxial cable connecting the output C2 of the coupler $14_2$ to the input B3 of the coupler $14_3$ and the coaxial cable connecting the output D2 of the coupler $14_2$ to the input B4 of the coupler $14_4$ is of the form $(n'-\Delta\Phi'/2\pi)\lambda'$, where n" denotes any integer, to obtain a gain in directivity of 2.95 dB.

For the reception part, two other duplexers $20_V$ and $22_H$ are connected to the vertical dipole of the antenna 10 and to the horizontal dipole of the antenna 12 respectively so as to separate the transmission and reception paths. These two duplexers provide the receiver R2 of the unit TR2 with its two spatially and polarisation diverse input radio signals.

The version example shown in FIG. 5 differs from that in FIG. 4 in that the output D1 of the distribution coupler $14_1$, is connected to the input B4 of the polarisation coupler $14_4$, whereas the output B2 of the distribution coupler $14_2$ is connected to the input A4 of the polarisation coupler $14_4$. This version thus gives the gain in diversity for the two radio signal sources T1 (LCP on antenna 10, RCP on antenna 12) and T2 (RCP on antenna 10, LCP on antenna 12).

Figure 6:
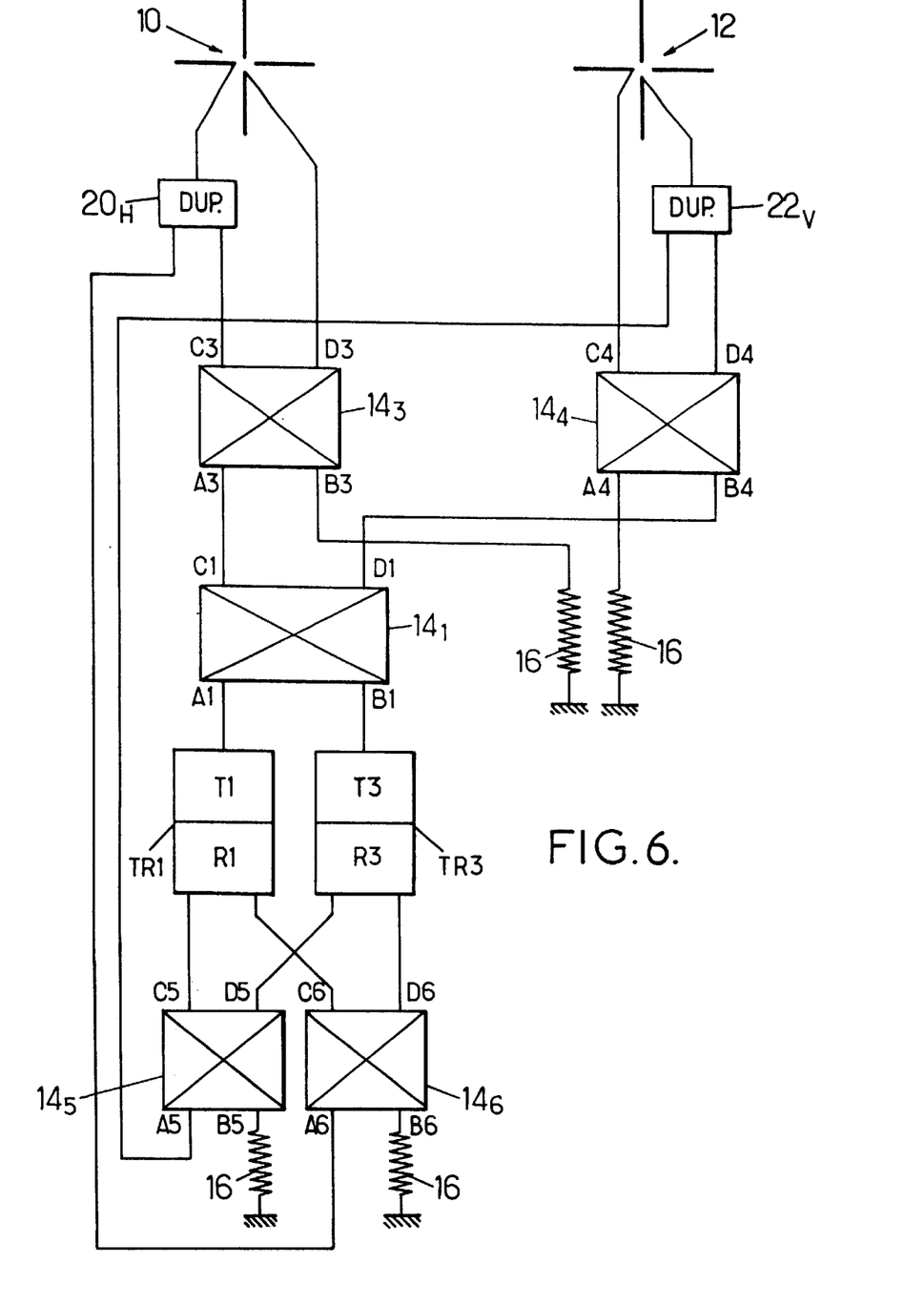

The version example shown in FIG. 6 provides comparable advantages to that in FIG. 5. In this example, there is no second distribution coupler $14_2$, the inputs B3 and A4 of couplers $14_3$ and $14_4$ being connected to impedance matching resistors 16. The source T3 of the second transceiver unit TR3 is connected to the input B1 of the distribution coupler $14_1$, with the result that the radio signal it delivers is transmitted with LCP by antenna 10 and with RCP by antenna 12. Two division couplers $14_5$, $14_6$, which may be of the type shown in FIG. 2 (i=5, 6), are provided for the reception part. The division coupler $14_5$ has its input A5 connected to the duplexer $22_V$, and its input B5 connected to an impedance matching resistor 16. Its output C5 supplies the first input signal to the receiver R1 and its output D5 supplies the first input signal to the receiver R3. The division coupler $14_6$ has its input A6 connected to the duplexer $20_H$, and its input B6 connected to an impedance matching resistor 16. Its output C6 supplies the second input signal from the receiver R1, and its output D6 supplies the second input signal from the receiver R3. Diversity in reception is thus obtained for each of the two receivers. Compared with the version example in FIG. 5, the one in FIG. 6 requires one additional hybrid coupler, and two fewer duplexers.

Figure 7:
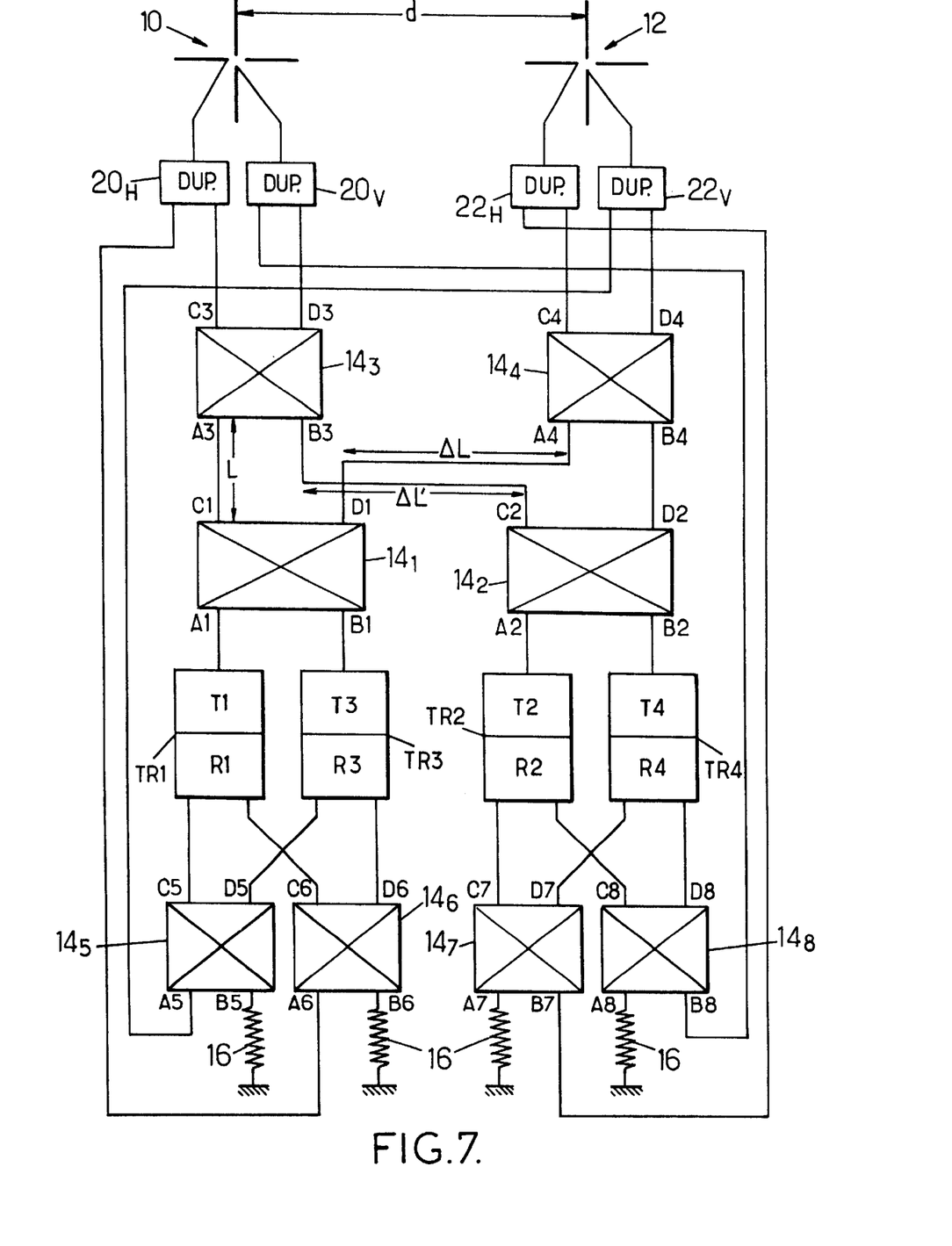
FIGS. 7 and 8 are diagrams of radio stations in accordance with the invention with four transceiver units.
Figure 8:
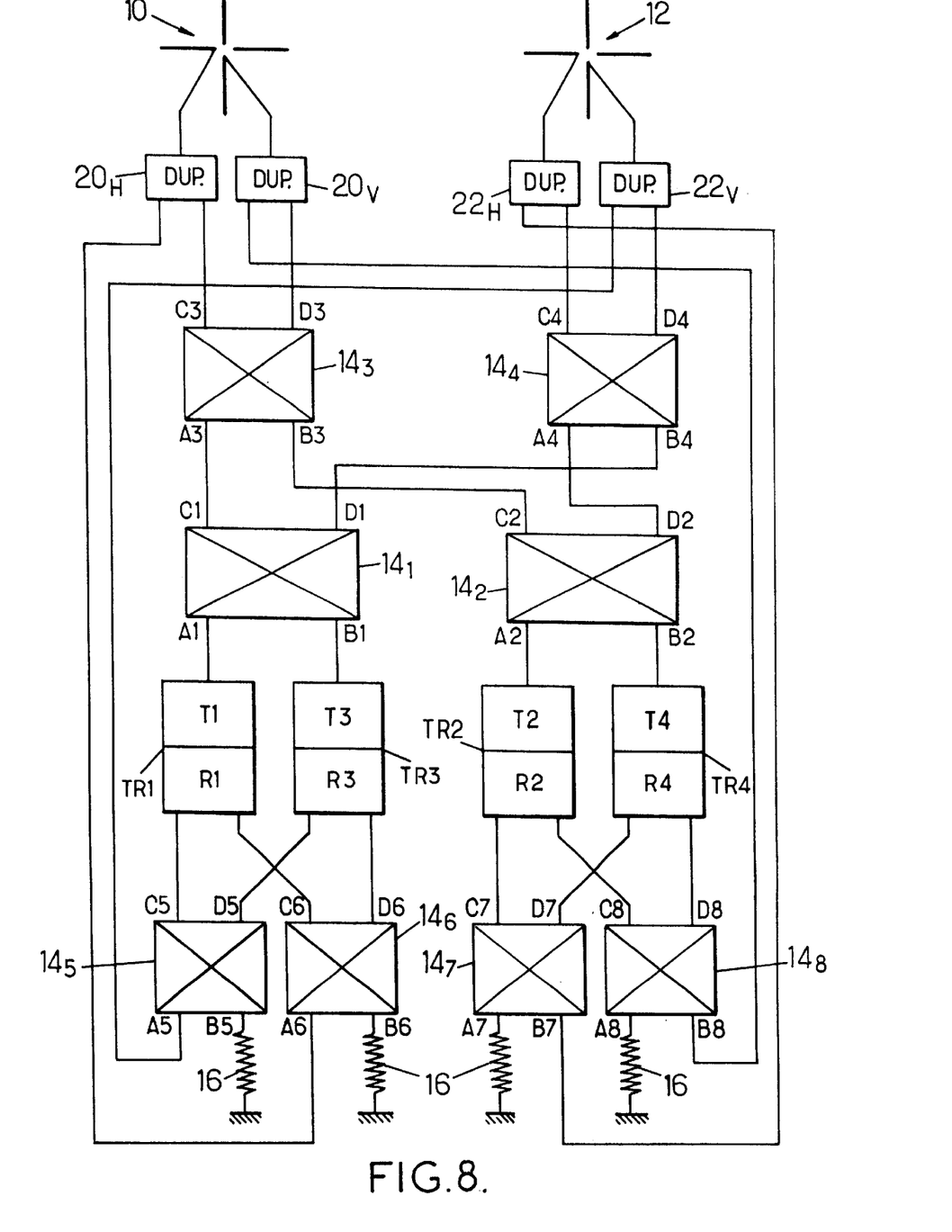

In the version examples shown in FIGS. 7 and 8, the radio station comprises four transceiver units TR1, TR2, TR3, TR4, two distribution couplers $14_1$, $14_2$, and four division couplers $14_5$, $14_6$, $14_7$, $14_8$.

In the example in FIG. 7, the distribution couplers $14_1$, $14_2$ are connected to the polarisation couplers $14_3$, $14_4$ in the same way as in the example in FIG. 4. The input B1 of the distribution coupler $14_1$ is connected to the radio signal source T3, whereas the input B2 of the distribution coupler $14_2$ is connected to the radio signal source T4. The division couplers $14_5$, $14_6$ are connected in the same way as in the example in FIG. 6. The two other division couplers $14_7$, $14_8$ which may also be of the type described by reference to FIG. 2 (i=7, 8), are similarly installed so as to supply two signals to each of the receivers R2 and R4 from electric field components supplied by the duplexers $22_H$ and $20_V$ and picked up by the horizontal dipole of the antenna 12 and by the vertical dipole of the antenna 10 respectively.

The signals produced by the sources T1 and T3 are transmitted with LCP by the two antennas, and those from the sources T2 and T4 are transmitted with RCP by the two antennas. It is thus possible to benefit from a gain in directivity for some at least of the sources. For example, if the distance d between the antennas and the differences in length $\Delta L$, $\Delta L'$ are selected in the way previously indicated, an optimum gain in directivity will be obtained for the sources T1 and T2. It is also possible to envisage some less than optimum choices which enable the gains in directivity to be shared between the four sources. It is further possible to take advantage of the possibility of obtaining different radiation patterns for the sources T1, T2, on the one hand and T3, T4 on the other hand, so as to create a multi-beam antenna system which would transmit with a degree of isolation the signals from T1 and T2 into one portion of space and those from T3 and T4 into another portion, thus enabling an "electronic sectoring" of the coverage area.

The version example shown in FIG. 8 differs from that in FIG. 7 by the form of connection of the coaxial cables connected to the outputs D1 and D2 of the distribution couplers $14_1$, $14_2$: the coaxial cable connected to the output D1 of the coupler $14_1$ is moreover connected to the input B4 of the polarisation coupler $14_4$, whereas the output D2 of the other distribution coupler $14_2$ is connected to the input A4 of the polarisation coupler $14_4$. In the case of FIG. 8, the four radio signal sources benefit from polarisation transmission diversity since the signal from each of them is transmitted with LCP by one antenna and with RCP by the other antenna.

It is noted that the radio station of the invention, the operational flexibility of which has already been stressed, has the additional advantage of being easily reconfigurable. Starting from a initial configuration such for example as the one on FIG. 1, the operator has the possibility of developing it as required by adding transceiver units to it, since the options for connection by coaxial cables enable a gain in directivity or in diversity to be obtained. Even in a configuration complete with four units TR1–TR4 such as the one in FIG. 7 or 8, the radio power from each of the four sources T1–T4 is fully radiated; there is no undesirable dissipation in the impedance matching resistors.

The invention has been described above in the case where the antennas 10, 12 are constituted by two crossed dipoles. The professional will appreciate that other antenna configurations could be used in the context of the present invention, so long as they enable two orthogonal electric field components to be generated in response to two quadrature radio signals. A usable antenna could thus be constituted by a square conductor pattern laid on a dielectric substrate, two adjacent sides of which would receive the radio signals from the corresponding polarisation coupler.

Figure 2:
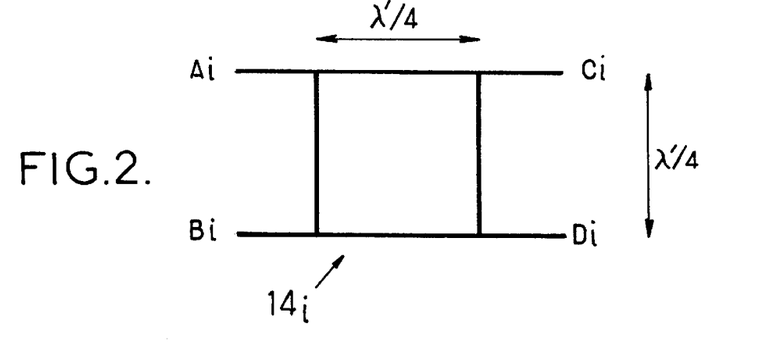
FIG. 2 is a diagrammatic view of a hybrid coupler which can be used in a station in accordance with the invention.

Moreover, it is possible to use hybrid couplers different from the one illustrated in FIG. 2. In particular, there is no requirement for the distribution couplers $14_1$, $14_2$ or division couplers $14_5$–$14_8$ to produce quadrature signals.

What is claimed is:

1. A radio station, comprising:
   first and second hybrid transmission polarisation couplers;
   first and second antennas respectively associated with said first and second hybrid transmission polarisation couplers, each antenna being arranged to generate two orthogonal electric field components in response to two respective quadrature radio signals from the polarisation coupler associated therewith;
   at least one hybrid distribution coupler having a first output connected to a first input of the first polarisation coupler and a second output connected to a first input of the second polarisation coupler; and
   at least one radio signal source delivering a radio signal to a first input of the distribution coupler.

2. A radio station in accordance with claim 1, wherein said hybrid couplers are connected to each other and to the first and second antennas in such a way that the radio signal delivered to said first input of the distribution coupler is transmitted by the first and second antennas in the form of two respective radio waves circularly polarised in the same direction.

3. A radio station in accordance with claim 2, a distance between the first and second antennas and lengths of coaxial cables connecting respectively the first output of the distribution coupler to the first input of the first polarisation coupler and the second output of the distribution coupler to the first input of the second polarisation coupler are selected so as to obtain a gain in directivity for the radio signal delivered to said first input of the distribution coupler.

4. A radio station in accordance with claim 3, wherein the distance between the first and second antennas is about $0.92\lambda$, where $\lambda$ denotes the wave length in the air of radio waves, and wherein a difference in length between the coaxial cable connecting the second output of the distribution coupler to the first input of the second polarisation coupler and the coaxial cable connecting the first output of the distribution coupler to the first input of the first polarisation coupler is of the form $(n-\Delta\Phi/2\pi)\lambda''$ where n is an integer, $\lambda''$ is the wave length of the radio signals in the coaxial cables, and $\Delta\Phi$ is a phase difference between a portion of the radio signal delivered to said first input of the distribution coupler present at the second output of the distribution coupler and another portion of the same radio signal present at the first output of the distribution coupler.

5. A radio station in accordance with claim 1, wherein said hybrid couplers are connected to each other and to the first and second antennas in such a way that the radio signal delivered to said first input of the distribution coupler is transmitted by the first and second antennas in the form of two respective radio waves circularly polarised in opposite directions.

6. A radio station in accordance with claim 1, further comprising another radio signal source delivering another radio signal to a second input of said distribution coupler.

7. A radio station in accordance with claim 1, comprising first and second distribution couplers and first and second radio signal sources, the first distribution coupler having a first input receiving a first radio signal from the first radio signal source, a first output connected to a first input of the first polarisation coupler and a second output connected to a first input of the second polarisation coupler, and the second distribution coupler having a first input receiving a second radio signal from the second radio signal source, a first output connected to a second input of the first polarisation coupler and a second output connected to a second input of the second polarisation coupler.

8. A radio station in accordance with claim 7, wherein said hybrid couplers are connected to each other and to the first and second antennas in such a way that each of said first and second radio signals is transmitted by the first and second antennas in the form of two respective radio waves circularly polarised in the same direction.

9. A radio station in accordance with claim 8, wherein a distance between the first and second antennas and lengths of coaxial cables connecting respectively the first output of the first distribution coupler to the first input of the first polarisation coupler, the second output of the first distribution coupler to the first input of the second polarisation coupler, the first output of the second distribution coupler to the second input of the first polarisation coupler, and the second output of the second distribution coupler to the second input of the second polarisation coupler are selected so as to obtain a gain in directivity for each of said first and second radio signals.

10. A radio station in accordance with claim 9, wherein the distance between the first and second antennas is about $0.92\lambda$, where $\lambda$ denotes the wave length in the air of radio waves, and wherein a difference in length between the coaxial cable connecting the second output of the first distribution coupler to the first input of the second polarisation coupler ($14_A$) and the coaxial cable connecting the first output of the first distribution coupler to the first input of the first polarisation coupler is of the form $(n-\Delta\Phi/2\pi)\lambda''$ where n is an integer, $\lambda''$ is the wave length of the radio signals in the coaxial cables, and $\Delta\Phi$ is a phase difference between a portion of the first radio signal present at the second output of the first distribution coupler and another portion of the first radio signal present at the first output of the first distribution coupler, and wherein a difference in length ($\Delta L'$) between the coaxial cable connecting the first output of the second distribution coupler to the second input of the first polarisation coupler and the coaxial cable connecting the second output of the second distribution coupler to the second input of the second polarisation coupler is of the form $(n'-\Delta\Phi=/2\pi)\lambda\Delta$, where n' is an integer, and $\Delta\Phi'$ is a phase difference between a portion of the second radio signal present at the first output of the second distribution coupler and another portion of the second radio signal present at the second output of the second distribution coupler.

11. A radio station in accordance with claim 7, wherein said hybrid couplers are connected to each other and to the first and second antennas in such a way that each of said first and second radio signals is transmitted by first and second antennas in the form of two respective radio waves circularly polarised in opposite directions.

12. A radio station in accordance with claim 7, wherein at least one of the first and second distribution couplers has a second input connected to another radio signal source.

13. A radio station in accordance with claim 1, further comprising at least one receiver ensuring a diversity treatment of two input radio signals, one of said input radio signals being obtained from an electric field component picked up by one of the first and second antennas in accordance with a first direction, and the other input radio signal being obtained from an electric field component picked up by the other one of the first and second antennas in accordance with a second direction orthogonal to said first direction.

14. A radio station in accordance with claim 13, comprising at least two receivers each ensuring a diversity treatment of two respective input radio signals, a first division coupler having an input receiving a radio signal obtained from an electric field component picked up by one of the first and second antennas in accordance with the first direction and two outputs each delivering an input radio signal to a respective one of the two receivers, and a second hybrid division coupler having an input receiving a radio signal obtained from an electric field component picked up by the other one of the first and second antennas in accordance with the second direction and two outputs each delivering the other input radio signal to a respective one of the two receivers.

* * * * *